United States Patent [19]

Pinto de Novais Paiva

[11] 4,166,727

[45] Sep. 4, 1979

[54] PROCESS FOR SEPARATING SUBSTANCES OF DIFFERENT MASSES

[76] Inventor: Manuel Pinto de Novais Paiva, 3, Italielaan, Overijse, Belgium

[21] Appl. No.: 775,601

[22] Filed: Mar. 8, 1977

[30] Foreign Application Priority Data

Mar. 23, 1976 [LU] Luxembourg ............................ 74622
Mar. 23, 1976 [LU] Luxembourg ............................ 76254

[51] Int. Cl.² ........................................... B01D 57/00
[52] U.S. Cl. ......................................... 55/17; 55/66; 55/266; 55/419; 210/65; 210/198 R
[58] Field of Search ...................... 55/17, 66, 83, 261, 55/266, 419; 210/65, 73 R, 198 R, 199

[56] References Cited

U.S. PATENT DOCUMENTS

| | | | |
|---|---|---|---|
| 2,533,966 | 12/1950 | Simmons, Jr. ............... | 55/66 X |
| 2,902,111 | 9/1959 | Henke et al. ............... | 55/17 |
| 2,951,554 | 9/1960 | Becker ........................ | 55/17 |
| 3,315,806 | 4/1967 | Sigwart, et al. ............ | 55/261 X |
| 3,708,961 | 1/1973 | Kimmel ...................... | 55/17 X |
| 3,748,826 | 7/1973 | Marchal et al. ............ | 55/17 |
| 3,990,634 | 11/1976 | Hejlek ........................ | 55/17 X |

FOREIGN PATENT DOCUMENTS

| | | |
|---|---|---|
| 916316 | 1/1963 | United Kingdom . |
| 1053947 | 1/1967 | United Kingdom . |
| 1162291 | 8/1969 | United Kingdom . |
| 1240121 | 7/1971 | United Kingdom . |
| 1316981 | 5/1973 | United Kingdom . |
| 1378717 | 12/1974 | United Kingdom . |

*Primary Examiner*—Robert H. Spitzer
*Attorney, Agent, or Firm*—Spencer & Kaye

[57] ABSTRACT

A process for separating substances of different masses, comprising admission of at least two fluids to one end of a duct arranged so as to allow a laminar flow of fluids so admitted, at least one of these fluids being periodically admitted into said duct and being comprised of a mixture of n substances of different masses, in being equal to at least 2, and collecting from the other end of the duct those fractions of the fluid mixture, wherein average relative concentration of at least one of the substances of the mixture of n substances is higher than in said admitted mixture.

17 Claims, 7 Drawing Figures

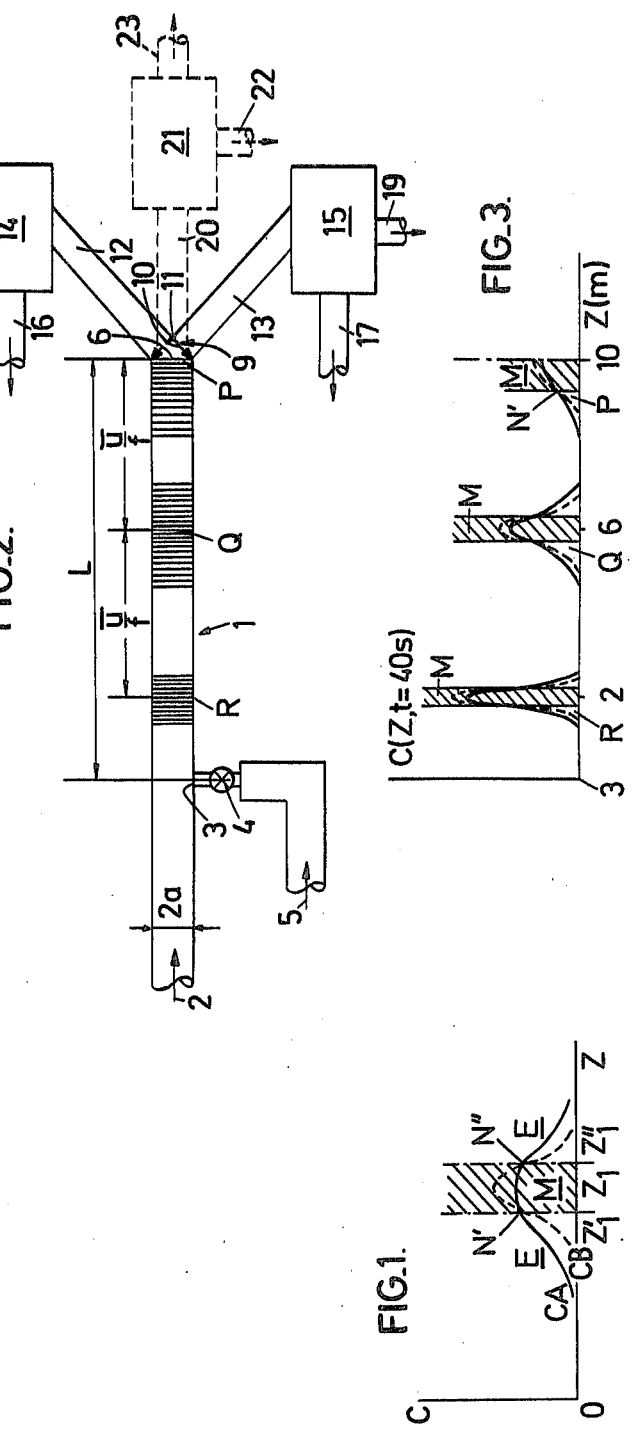

PROCESS FOR SEPARATING SUBSTANCES OF DIFFERENT MASSES

This invention concerns a process for separating substances of different masses, by dispersion.

This invention more particularly concerns separation of isotopes.

Several processes and apparatus for separating isotopes are known, which differ depending on isotopes to be separated and on desired outputs.

Processes for separating isotopes are generally classified in two categories according as the mixture to be separated contains light or heavy isotopes. Thus electrolysis, distillation, thermodiffusion or mass diffusion processes are mainly used for separating light isotopes (H, C, N, O), while ultracentrifugation process, nozzle process and gaseous diffusion process are used for separating heavy isotopes, more particularly U isotopes.

It is for example known to use a mass diffusion process wherein the mixture of fluids to be separated and a carrier gas are caused to diffuse through concentric columns forming a screen. The faster molecular diffusion of the lighter gas of the mixture to be separated allows a partial separation to be obtained. However, the separation coefficient $\alpha$ in a separation element cannot exceed according to this process the following theoretical value:

$$\alpha = \sqrt{(m_1+m_0)/(m_2+m_0)\cdot(m_2/m_1)} \qquad (1)$$

wherein $m_0$ is the molecular mass of the carrier gas and $m_1$ and $m_2$ are the molecular masses of each component of the mixture to be separated, $m_2$ being higher than $m_1$. Furthermore, it is preferred to use a carrier gas of a mass which is substantially equal to that of the mixture to be separated, in order to prevent a too slow diffusion. Finally, the separation apparatus which is used comprises a complex and expensive screen system.

It is also known to use a process for separating isotopes by diffusion according to the principle of gas chromatography. According to this process, a gaseous mixture of isotopes is periodically injected into a continuously circulating gas carrier, and the whole is passed through an enclosure containing an adsorbent porous medium. Interaction of the molecules of the mixture to be separated, with adsorbent compound causes a partial separation of the components of the mixture to be separated. This process has the drawback of having a very low output by separation element, and consequently of needing use of a large number of elements in parallel in each separation stage.

This invention has for its object to provide a new process for separating substances of different masses, more particularly of isotopes, this process allowing use thereof in the separation as well of heavy isotopes as of light isotopes, the apparatus for carrying out this process of separation being simple in construction and not very expensive in maintenance.

According to the invention, the separation process comprises admission of at least two fluids to one end of a duct arranged so as to allow a laminar flow of fluids so admitted, at least one of these fluids being periodically admitted into said duct and being comprised of a mixture of n substances of different masses, n being equal to at least 2, and collecting from the other end of the duct those fractions of the fluid mixture, wherein average relative concentration of at least one of the substances of the mixture of n substances is higher than in said admitted mixture.

According to a particular embodiment of the invention, this process comprises continuous admission of a first fluid and periodical admission of a second fluid which is the mixture of n substances of different masses.

More particularly, according to the invention, each portion of the admitted mixture of n substances giving rise at the collection location to a fluid presenting with respect to the relative concentration of substances at its admission location, within a first period a relative concentration higher in n' substances of higher mass, within a second period a relative concentration higher in n'' substances of lower mass and within a third period, again a relative concentration higher in n' substances of higher mass, n' and n'' being each equal to at least 1, one separately collects, on the one hand, the fractions of the fluid mixture corresponding to first and third periods respectively and, on the other hand, fractions corresponding to second periods.

According to a particular embodiment of the invention, fractions of the fluid mixture are also separately collected for intermediate periods between said first and second periods and between said second and third periods, during which intermediate periods the relative substance concentrations of the mixture of n substances are substantially equal to those of the admitted mixture.

According to an advantageous embodiment of the invention, the process comprises alternate admission into the duct of a first fluid and of the mixture of n substances of different masses as second fluid.

According to an improved embodiment, the first fluid comprises a mixture of m substances of different masses, m being equal to at least 2.

The apparatus provided for carrying out the process according to the invention is very simple. According to an embodiment of this apparatus, the latter comprises a main duct arranged so as to have a laminar flow of fluids admitted therein, means for continuous admission of a first fluid and means for periodical admission of portions of at least a second fluid, said admission means being located at one end of the main duct, at least two flowing-out passages located on the other end of said duct, and valve means for alternately communicating the main duct with each of said flowing-out passages.

According to another embodiment, this apparatus comprises a main duct arranged so as to have a laminar flow of fluids admitted therein, means for periodical admission of portions of a first fluid and of portions of at least a second fluid, said admission means being located at one end of the main duct, at least two flowing-out passages located at the other end of said duct, and valve means for alternately communicating the main duct with each of said flowing-out passages.

Other details and features of the invention will become apparent from the description given hereinafter by way of non-limitative example, with reference to annexed drawings wherein:

FIG. 1 schematically illustrates the process according to the invention.

FIG. 2 is a schematically view of a first example of an apparatus for carrying out the process according to the invention.

FIG. 3 shows a diagram concentration/length of the main duct, corresponding to FIG. 2.

Figure 4:
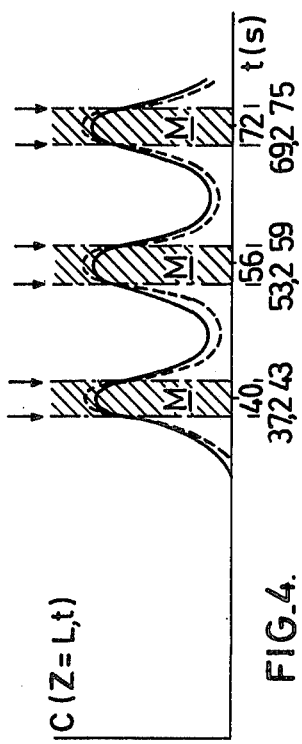
FIG. 4 is a diagram concentration/time, corresponding to FIG. 2.

It is to be recalled that Taylor has shown (see Taylor, G. I., Dispersion of soluble matter in solvent flowing slowly through a tube—Proc. Roy. Soc. A. 219,186–203, 1953) that when a soluble substance is admitted into a so-called carrier fluid which flows into a tubular duct of circular cross-section according to a laminar way, it is dispersed due to the combined action of the molecular diffusion and of the speed variation in any point across the cross-section. Axial dispersion is characterised by a virtual diffusion coefficient K.

$$K = \frac{a\,u}{48\,D\mathrm{mol}} \quad (2)$$

wherein $D\mathrm{mol}$ is the molecular diffusion coefficient of the soluble substance; $a$ is the tube radius and $\bar{u}$ is the average axial convection speed of the laminar flow fluid.

Later, Aris has shown (Aris R. On the dispersion of a solute in a fluid flowing through a tube—Proc. Roy. Soc. A., 235,67–77, 1956) that formula (2) is more correctly written as follows:

$$K = D\mathrm{mol} + \frac{a^2 u^2}{48\,D\mathrm{mol}} \quad (3)$$

Moreover, axial distribution of a substance which is instantaneously admitted at a location into the laminar flow fluid, this location being considered as the origin ($z=0$) of a coordinate system C (concentration), z (axial distance) can be illustrated by the Gauss curve:

$$C(z, t) = \frac{1}{2\sqrt{\pi K t}} e^{-\frac{(z - u t)^2}{4 K t}} \quad (4)$$

Also according to Taylor (Conditions under which dispersion of a solute in a stream of solvent can be used to measure molecular diffusion. Proc. Roy, Soc. A., 225,473–477, 1954), equations (2) and (4) are exact if both following conditions are met:

—on the one hand:

$$\frac{4L}{a} >> \frac{\bar{u}\,a}{D\mathrm{mol}} >> 6{,}9 \quad (5)$$

wherein L is the tube length between the location where the axial concentration was examined and the location where the substance was admitted.

—on the other hand, the Reynolds number must be lower than the critical number:

$$Re = \frac{2\,a\,u}{\nu} < 2000 \quad (6)$$

wherein $\nu$ is the kinematic viscosity of the carrier fluid.

According to an embodiment of this invention, portions of a second fluid comprised of a mixture of n substances of different masses, n being equal to at least 2, are periodically admitted into a duct inside which a carrier fluid flows in a laminar way, while from the other end of this duct, fractions of fluid mixture, wherein the average relative concentration of at least one of the substances of the mixture of n substances is higher than in the admitted mixture, are separately collected.

To illustrate this process, FIG. 1 schematically presents, as a coordinate system C (axial concentration) z (distance from admission point O), the axial concentration curves of two substances A, B, which were admitted as a mixture into a tube in which a fluid flows in a laminar way. Conditions (5) and (6) are supposed being met, reference L corresponding to distance OZ1. It has moreover been considered that in the admitted mixture, substance A and substance B are present in equal concentrations (50% each) and that said substances differ from one another in their coefficient of molecular diffusion in the carrier fluid, substance A being of a higher mass than substance B.

At location Z1, there exists an area M substantially extending from Z1' to Z1'' which are determined by crossing points N', N'' of curves $C_A$, $C_B$; in said area M, the carrier fluid has a high concentration in substances A and B with a higher relative concentration than at the admission location O of the mixture, in substance of lighter mass B. On both sides of Z1', Z1'', an area E exists wherein both substances are present with lower and lower concentration as the distance from Z1', Z1'' becomes larger; in these areas E, the carrier fluid has a higher relative concentration than at the admission location O of the mixture, in substance of higher mass A.

When according to the invention, portions of the mixture are periodically admitted at location O, while at location Z1, fractions of fluid mixture are separately collected, these latter fractions corresponding to areas M on the one hand and the areas E on the other hand, what is the purpose of the invention is then reached, namely separation into fractions one of which is enriched with substance of lighter mass, while the other fraction is enriched with substance of higher mass.

It has to be understood that the process applies to mixtures comprising more than two different substances, as well as to mixtures having unequal concentrations of substances having different masses. Curves shown in FIG. 1 are then obtained by multiplying each concentration by a factor which is the sum of all the substance concentrations in the admitted mixture, divided by the concentration of the substance considered in the admitted mixture.

FIG. 2 schematically shows by way of non limitative example an apparatus for carrying out the process according to the invention. This apparatus comprises a main duct 1 which is fed through 2 with a carrier fluid. At a location 3, a valve 4 is provided which periodically opens for admitting into duct 1 some portions of a mixture of substances having different masses to be separated, this mixture being fed through 5. At a location 6 removed by a distance L from the mixture admission location 3, duct 1 is divided into two flowing-out passages 12, 13. At the branching location 6, a valve means 9 is arranged, which is able alternately to communicate main duct 1 with flowing-out passage 12 and flowing-out passage 13.

In the embodiment such as shown, valve means 9 comprises a register 10 pivoting about an axis 11, this register being alternately moved from the continuous line position to the broken line position and vice versa. Flowing-out passages 12, 13 each suitably open into a separator 14, 15, each of said separators being arranged so as to allow separation of the substance mixture from the carrier fluid; the latter leaves from 16, 17 and the mixture enriched with at least one of the substances leaves from 18 or 19.

As it will be explained in greater detail hereinafter, the process according to the invention is advantageously repeated many times with portions of initial mixture which are gradually enriched with or reduced in at least one of the substances of the initial mixture. In this case, the apparatus described with reference to FIG. 2 shows a separating unit.

An embodiment of the process and apparatus according to the invention will be now described by considering a gaseous mixture of $H_2O^{16}$ and $H_2O^{18}$ admitted into a gaseous argon flowing in a laminar manner through main duct 1. This duct has a radius a of 1 cm; argon flows at an average speed u of 25 cm/sec; distance $L=10$ m; admission frequency of the mixture portions $f=1/16$ s and mixture portions are of 16 cm$^3$.

Molecular diffusion coefficient of water vapour in argon is $Dmol \approx 0.2$ cm$^2$/sec; it is slightly higher for $H_2O^{16}$ than for $H_2O^{18}$.

Conditions (5) [$4000 \geqslant 125 \geqslant 6.9$] and (6) [$Re=403<2000$] are met.

In FIG. 2, inside the main duct are shown by vertical lines of varying closeness, duct zones wherein after 40 seconds following admission of a portion P of the mixture, maximum concentration of this portion P has reached branching location 6, while two subsequent portions Q and R have their maximum remote by 4 m and 8 m respectively from the maximum concentration of portion P.

FIG. 3 illustrates spatial distribution of concentrations, as a function of the distance $0 \leqslant z \leqslant 10$ m with respect to their admission point 3, of successive mixture portions P, Q, R, while using scale of FIG. 2 for abscissa z and normalizing curves C at a concentration which is equal to two substances $H_2O^{16}$, $H_2O^{18}$ in the mixture of admitted portions; this normalization is advisable so as to make clearer the principle of the process according to the invention.

In the diagram of FIG. 3, curves in broken line correspond to $H_2O^{16}$, while continuous line curves correspond to $H_2O_{18}$. Hatched areas correspond to portions of duct 1 wherein portions of the admitted mixture are enriched with $H_2O^{16}$. Position of the register of the valve means 9 is that shown in continuous line in FIG. 2, which means that at the time considered, the fluid enriched with $H_2O^{16}$ flows through the flowing-out passage 12.

Movement of valve 9 changes when at location 6 the relative concentration of $H_2O^{16}$ and $H_2O^{18}$ is substantially the same as in the mixture at the admission moment thereof; this moment substantially corresponds for portion P to that where fluid cross section in a plan normal to the axis of duct 1 and passing through point N' reaches branching location 6. At this moment, valve register 10 takes the position such as shown in broken line in FIG. 2, which means that fluid reduced in $H_2O^{16}$, namely enriched with $H_2O^{18}$, flows through flowing-out passage 13.

Concentration of $H_2O^{18}$ (continuous line) and of $H_2O^{16}$ (broken line) in the carrier fluid is shown in FIG. 4 as a function of the time, at branching location 6, curves being normalized at concentration values considered as being equal in the admitted mixture. Valve 9 substantially pivots at the times 37.2 s; 43 s; 53.2 s; 59 s; 69.2 s; 75 s . . . , while remaining in the position such as shown in continuous line in FIG. 2 for the periods 37.2 s–43 s; 53.2 s–59 s; 69.2 s–75 s and in the position in broken line for intermediate periods. These times substantially correspond to the crossing times between concentration curves, shown by vertical arrows.

Values of C $(z=L,t)$ are obtained from preceding equations (3) and (4) with Dmol $(H_2O^{16}-A)=0.2$ cm$^2$/s and Dmol $(H_2O^{18}-A)=0.2 \times \sqrt{(20+40)/(18+40)} \cdot (18/20)$.

Figure 5:
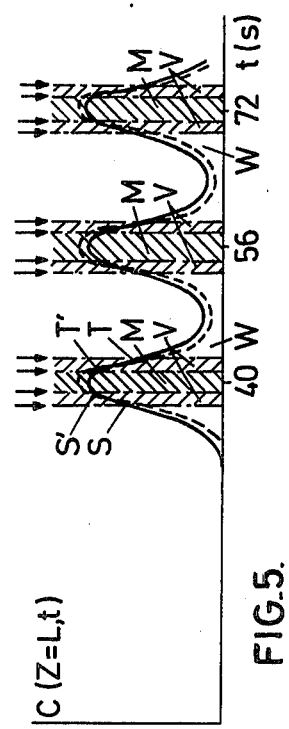
FIG. 5 is a view similar to FIG. 4 but corresponding to a modified embodiment of the process of the invention.

In the process such as just described, the carrier fluid wherein fluid portions comprising substances to be separated are admitted, comprises at the collection location of fractions of the fluid mixture, some portions having a relative concentration of substances which is substantially equal to that which is present in the admitted mixture. According to a variant of embodiment, those fractions of fluid mixture wherein substances of the mixture to be separated have an average relative concentration which is substantially equal to that of the admitted mixture are separately collected and after having separated the carrier fluid therefrom, said mixture portions are recirculated in order to be readmitted into the carrier fluid. This variant is schematically illustrated with reference to FIG. 5. Fractions corresponding to areas M, V and W are collected separately; fluid of areas M is enriched with the lighter substance of the mixture, fluid of areas V has an average relative concentration which is substantially the same as that of the admitted mixture of heavy and light substances, while fluid of areas W is enriched with the heavier substance.

In FIG. 2, a third flowing-out passage 20 provided for fractions corresponding to areas V is shown in broken line, this passage 20 reaching a separator 21 from which the mixture of substances, such as separated from the carrier fluid, is for example led through 22 to the feed duct 5 for the mixture to be admitted, and the carrier fluid is fed through 23 to the feed duct 2 for the carrier fluid. In this case, valve means 9 must be of the four-way type with changing-over of the ways at the times indicated in FIG. 5 by vertical arrows drawn above the curves.

As it is apparent from the preceding description, the process according to the invention has the advantage of allowing use of a carrier gas of a much heavier mass than the substance mixture to be separated. As a matter of fact, being given the inverse relation between the dispersion and the diffusion coefficient according to equation (2), the dispersion is accelerated and the maximum separation coefficient according to equation (1) is higher. On the other hand, the apparatus comprises a separation element formed with a duct simple in construction and maintenance, which only acts so as to ensure a laminar flow of the fluids. Use of a number of outlets higher than two allows an increase in the separation coefficient.

Figure 6:
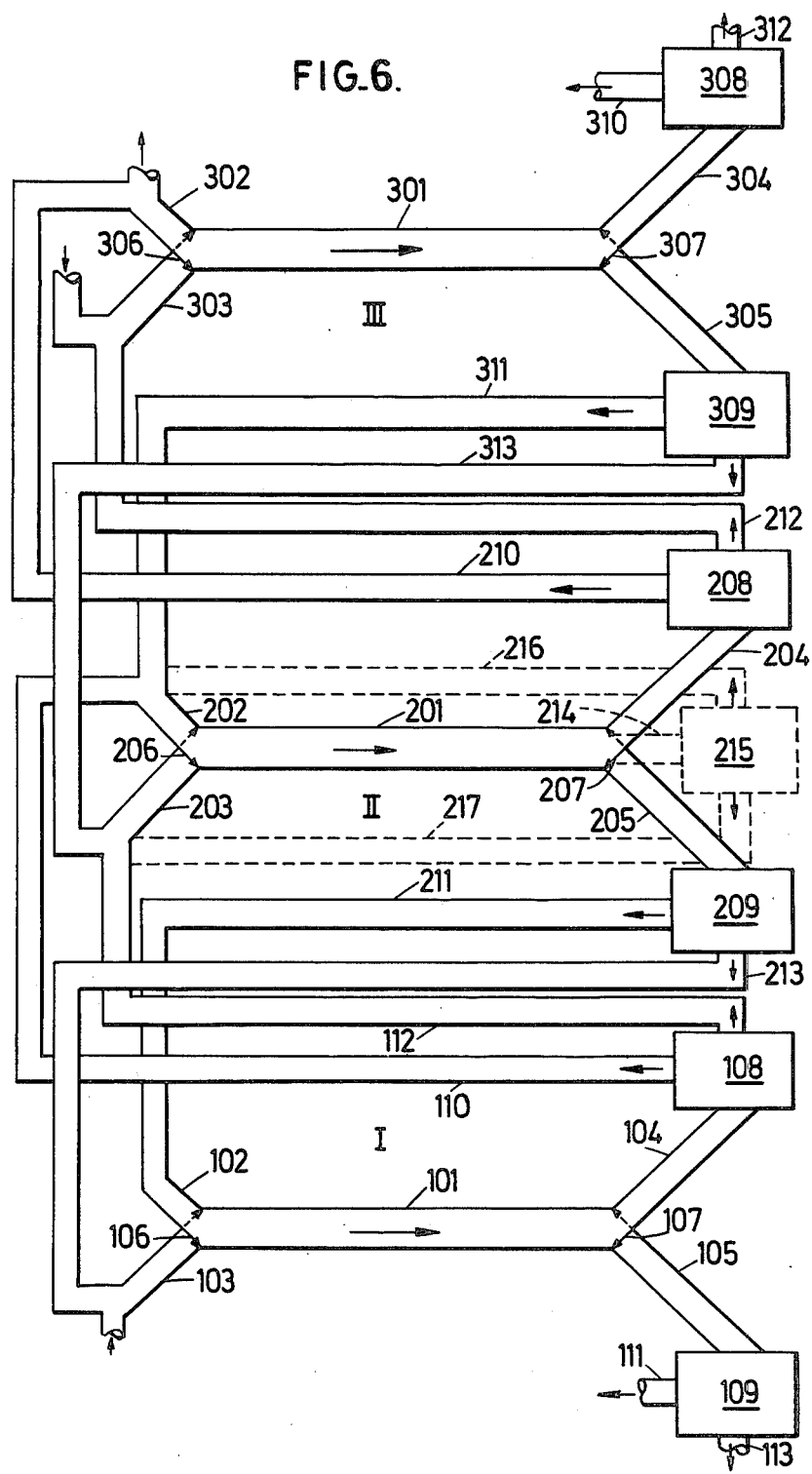
FIG. 6 is a schematical view of several separation stages arranged in series of a separation plant, each stage comprising a variant of embodiment of the separation apparatus according to the invention.

In the plant as shown in FIG. 6, enrichment with oxygen, nitrogen and carbon with their heavy isotopes is made according to a modified embodiment of the invention. The following Table gives the percentage of each stable isotope in natural nitrogen, oxygen and carbon from which the various percentages of $CO_2$ obtained from the various isotopes of C and O are calculated.

TABLE

| Nitrogen % | Oxygen % | Carbon % | $CO_2$ | MW | % |
|---|---|---|---|---|---|
| $N_2^{14}$ 99.28 | $O_2^{16}$ 99.52 | $C^{12}$ 98.9 | $C^{12}O_2^{16}$ | 44 | 98.42 |
| $N^{14}N^{15}$ 0.72 | $O^{16}O^{17}$ 0.08 | $C^{13}$ 1.1 | $C^{13}O_2^{16}$ | 45 | 1.1 |
| $N_2^{15}$ <0.005 | $O^{16}O^{18}$ 0.40 | | $C^{12}O^{16}O^{18}$ | 46 | 0.4 |
| | | | $C^{12}O^{16}O^{17}$ | 45 | 0.08 |
| | other possibilities <0.005 | | other possibilities <0.005 | | |

It becomes apparent from this Table that a mixture of $CO_2$ is essentially constituted of molecules having a mass number which is equal to 44, 45 and 46. The mixture of $N_2$ is essentially constituted of molecules of a mass number equal to 28-29.

In FIG. 6, three separation stages I, II and III are shown, which form part of a large number of stages which are arranged in series. Each stage comprises an apparatus for carrying out the process according to the invention. Identical elements of each stage are designated by the same reference numerals plus 100 for stage I, plus 200 for stage II and plus 300 for stage III.

The apparatus according to the invention comprises a main duct 101 (201,301) arranged so as to allow a laminar flow of the fluids which are admitted thereto, a feed duct 102 (202,302) for a first gaseous mixture, for example nitrogen, and a feed duct 103 (203,303) for a second gaseous mixture, for example carbon dioxide (in this case, the term "mixture" means isotope mixture); both these ducts are connected to one end of said main duct. At the other end of main duct 101 (201,301), at least two flowing-out passages 104 (204,304) and 105 (205,305) are arranged. Both feed ducts 102 (202,302) and 103 (203,303) are connected, in the embodiment of FIG. 6, to main duct through a valve with two inlets and one outlet 106 (206,306) which is arranged so as to allow an alternating injection of fluids into the main duct.

In the position shown in FIG. 6, valve 106 (206,306) allows nitrogen to pass into main duct and prevents admission of $CO_2$ into the latter. Both flowing-out passages 104 (204,304) and 105 (205,305) are connected with the end of main duct 101 (201,301) through a valve with one inlet and two outlets 107 (207,307), which is arranged so as to alternately communicate each of the flowing-out passages with the main duct. Said flowing-out passages each open into a separator, flowing-out passage 104 (204,304) into separator 108 (208,308) and flowing-out passage 105 (205,305) into separator 109 (209,309). Each separator comprises two discharge pipes, in the present case one for nitrogen and the other one for carbon dioxide. Separator 108 (208,308) comprises discharge pipes 110 (210,310) and 112 (212,312) while separator 109 (209,309) comprises discharge pipes 111 (211,311) and 113 (213,313).

In addition, a third flowing-out passage 214 may be provided at the outlet end of main duct. This passage is shown in broken line in FIG. 6 only on stage II of the plant. In this case, valve 207 should have one inlet and three outlets and it would operate such as already described with reference to the apparatus of FIG. 2. The flowing-out passage 214 is itself connected with a separator 215 having two discharge pipes 216 and 217, one for nitrogen, the other one for $CO_2$.

Into main duct 201, alternately a mixture of $N_2$ is admitted through feed duct 202 and a mixture of $CO_2$ through feed duct 203, this alternating injection being obtained by means of valve 206. Each of said fluids flows in a laminar manner through main duct and isotopes of each of said mixtures disperse according to previously described manner. At the end of main duct, fractions of injected fluids are separately collected by means of valve 207, in which fractions the average relative concentration of at least one of the isotopes of each fluid is higher than in the admitted mixture.

Figure 7:
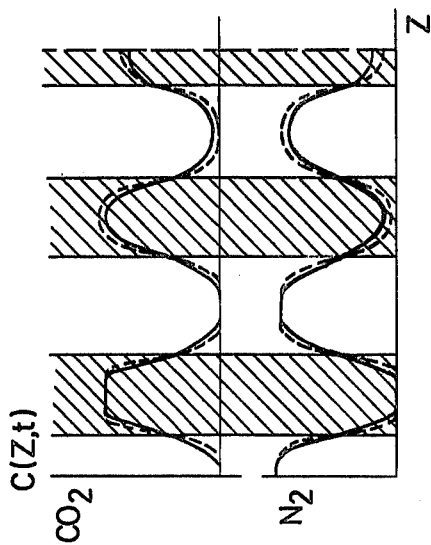
FIG. 7 is a diagram illustrating spatial distribution of concentrations of different isotopes as a function of the distance from the inlet into the main duct of a stage of FIG. 6.

In the diagram of FIG. 7, spatial distribution of concentrations (ordinate), as a function of the distance from the inlet into main duct (abscissa) of successive portions of mixtures of $N_2$ and $CO_2$ isotopes, is illustrated, using scale of FIG. 6 for abscissa z and normalizing curves C at an equal concentration in $N_2^{14}$ and $N^{14}N^{15}$ in the admitted portions of $N_2$ and at an equal concentration in $C^{12}O^{16}$ and in $(C^{13}O_2^{16}+C^{12}O^{16}O^{18}+C^{12}O^{16}O^{17})$, in admitted portions of $CO_2$. This normalization was necessary in order to more clearly make evident the principle of this variant of the invention.

In diagram of FIG. 7, for mixture of $N_2$, the curve in broken line corresponds to $N_2^{14}$, while the curve in continuous line corresponds to $N^{14}N^{15}$. Hatched areas correspond to duct parts where portions of injected $N_2$ mixture are reduced in $N_2^{14}$. Position of valve 207 is that such as shown in continuous line in FIG. 6, i.e. at the given moment, a fluid reduced in $N_2^{14}$ flows through flowing-out passage 204.

For $CO_2$ mixture, the curve in broken line corresponds to $C^{12}O_2^{16}$, while the curve in continuous line corresponds to the mixture of other $CO_2$ isotopes. Hatched areas correspond to duct parts where portions of the injected $CO_2$ mixture are enriched with $C^{12}O_2^{16}$. In the mentioned valve position, a fluid enriched with $C^{12}O_2^{16}$ flows through flowing-out passage 204.

The valve position changes when relative concentration of $N_2^{14}$ and $N^{14}N^{15}$ is substantially the same as in the injected $N_2$ mixture, and also when relative concentration of $C^{12}O_2^{16}$ and of the mixture of other $CO_2$ isotopes is substantially the same as in the injected $CO_2$ mixture.

From this moment, a fluid enriched with $N_2^{14}$ and reduced in $C^{12}O_2^{16}$ flows through flowing-out passage 205.

It is however to be noted, on the one hand, that relative concentrations of isotopes of each of both alternately injected fluids do not necessarily become equal to relative concentration of the admitted fluid portions at the same moment, and on the other hand that relative concentrations of isotopes of each of said fluids may remain substantially equal to relative concentrations of admitted fluid portions for some lapse of time. It is then preferred to separately collect fluid portions having these relative concentrations which are substantially equal to the admission concentration by means of the flowing-out passage 214. Both fluids are separated in separator 215, separated nitrogen being recirculated into feed duct 202 through pipe 216 while carbon dioxide is recirculated into feed duct 203 through pipe 217.

Fluid collected in separator 208 is separated and a mixture of nitrogen isotopes reduced in $N_2^{14}$ reaches feed duct 302 of top stage III through pipe 210, while a $CO_2$ mixture enriched with $C^{12}O_2^{16}$ is sent into feed duct 303 of stage III through pipe 212.

In an analogous manner, fluid collected in separator 209 is separated and a $N_2$ mixture enriched with $N_2^{14}$ reaches feed duct 102 of lower stage I through pipe 211, while a $CO_2$ mixture reduced in $C^{12}O_2^{16}$ reaches feed duct 103 of stage I through pipe 213.

At the end of circulation through separation stages, collected $CO_2$ mixtures can be broken down into carbon and oxygen, which will allow these elements to be obtained as different isotope forms. Accordingly, in the example involved, the process of the invention allows three different elements to be enriched with or reduced in their different isotopes.

If a more higher enrichment with either of oxygen or carbon isotopes is desired, it is advantageous to provide an intermediate chemical decomposition of $CO_2$ into carbon and oxygen, and possibly a recombination of the fractions which are the richest in desired isotopes, before continuing with the enrichment, or still the provision of an isotope exchange by means of a catalyst.

In FIG. 6, a very simple embodiment arranged in series is shown in order to make clear the understanding of the invention. This embodiment is however not necessarily the most efficient when ratios between amounts of fluids separated in the separators and the total amount of the fluid mixture admitted into said separators are not equal but are for example of $\frac{1}{3}$ and $\frac{2}{3}$. In this case, fluid portion corresponding to $\frac{1}{3}$ of the mixture admitted into the separator will not be admitted into main duct of the immediately next adjacent stage but rather for example into main duct of the following stage.

It has to be understood that this invention is by no way limited to the embodiment such as hereinbefore described and that many changes may be brought thereto without departing from the scope of the present patent.

It is obvious that it is possible to provide separation of isotopes from other gases than those such as mentioned as examples, more particularly from $H_2$, $CH_4$, CO, $NH_3$, NO and the like.

It can also be provided that the first fluid which is alternately injected be composed of only one substance in gaseous state, which is not subjected to a isotope separation.

It is also possible to provide subsequent injection of at least one additional fluid in addition to first and second fluids such as mentioned, and consequently to provide means for periodical admission of each additional fluid into main duct.

It is also possible to provide changes in fluid circulation between various stages, according to the desired purposes and circulation directions.

It is also to be noted that the process according to the invention is able to separate as well heavy isotopes as light isotopes. For example, in the case of heavy isotope separation, such as uranium isotopes, $C_7F_{16}$ is for example advantageously used as carrier gas. In this case, according to equation (1), one obtains $\alpha = 1.0023$, i.e. a coefficient which is very close to the value obtained from the gaseous diffusion process which is traditionally used in the industry.

Finally, it is to be noted that this separation process is applicable not only to gases but also to substances in liquid condition.

I claim:

1. A process for separating substances of different masses by dispersion, comprising:
   (a) admitting a first fluid and a second fluid at one end of a separating duct to form one stream containing a mixture of the admitted fluids, the second fluid being comprised of a mixture of n substances of different masses, n being equal to at least 2, and being periodically admitted to the separating duct,
   (b) flowing the admitted fluids in laminar flow through the separating duct,
   (c) axially dispersing the substances of the second admitted fluid in the stream to form at least two fluid fractions of the mixture of admitted fluids, with one of the fractions having a higher concentration of the first admitted fluid than the other fraction, wherein in each of the two fractions the average relative concentration of at least one of the n substances is higher than in the admitted second fluid, the average relative concentration of the substance having the heaviest mass being the highest in the fraction which has the highest concentration of the first admitted fluid, and,
   (d) collecting at least two fluids at the other end of said separating duct, the collected fluids being said fractions of the mixture of admitted fluids.

2. A process as claimed in claim 1, comprising continuously admitting the first fluid.

3. A process as claimed in claim 2, wherein the first admitted fluid acts as carrier fluid and is of a much higher mass than the second admitted fluid.

4. A process as claimed in claim 1 wherein the admitted mixture of n substances of different masses comprises at least two isotopes.

5. A process as claimed in claim 4 wherein the admitted mixture of n substances is a mixture of molecules of a substance several elements of which are as different isotope forms.

6. A process as claimed in claim 1 wherein each admission of the periodically admitted mixture of n substances gives rise at the collection location, to a fluid presenting, with respect to the relative concentration of substances at its admission location, within a first period a relative concentration higher in n' substances of higher mass, within a second period a relative concentration higher in n" substances of lower mass, and within a third period, again a relative concentration higher in n' substances of higher mass, n' and n" being each equal to at least 1; and separately collecting (a) the fractions of the fluid mixture corresponding to first and third periods respectively from (b) the fractions corresponding to second periods.

7. A process as claimed in claim 6 wherein fractions of the fluid mixture are separately collected for intermediate periods between said first and second periods and between said second and third periods, during which intermediate periods the relative substance concentrations of the mixture of n substances in the fluid being collected are substantially equal to those of the admitted mixture of n substances.

8. A process as claimed in claim 7 wherein fractions of fluid mixture, which are separately collected and which comprise, at the collection location, portions of the mixture of n substances having a relative substance concentration substantially equal to that of said admitted mixture of n substances are treated to separate the first fluid from the second admitted fluid, and the separated second fluid is recirculated to said one end of the separating duct.

9. A process as claimed in claim 6, wherein fractions of fluid mixture, which are separately collected, are treated in order to separate the first fluid from the second fluid, portions of the separated second fluid being again treated by a similar process in another separating duct.

10. A process as claimed in claim 1, comprising alternate admission into the duct of the first fluid and of the mixture of n substances of different masses as second fluid.

11. A process as claimed in claim 10, wherein the first admitted fluid comprises a mixture of m substances of different masses, m being equal to at least 2.

12. A process as claimed in claim 11, wherein at the collection location, fractions of the fluid mixture are separately collected wherein the average relative concentration of at least one of the substances of the mixture of m substances is higher than in the first admitted fluid.

13. A process as claimed in claim 11, wherein each admission of the first admitted fluid gives rise at the collection location to a fluid having, with respect to the relative concentration of m substances at its admission location, within a first period a relative concentration which is higher in m' substances of higher mass, within a second period a relative concentration which is higher in m" substances of lower mass, and within a third period, again a relative concentration which is higher in m' substances of higher mass, m' and m" being each equal to at least 1, and each admission of the second admitted fluid, alternately admitted with respect to the first fluid, gives rise to an analogous succession of three periods, with a relative concentration higher in n' substances of higher mass being obtained for a first and a third period and a relative concentration higher in n" substances of lower mass being obtained for a second period, n' and n" being each equal to at least 1; and separately collecting (a) fractions of fluid mixture corresponding to first and third periods of the first fluid respectively, portions of the second fluid which are collected at that time having approximately a concentration corresponding to its second periods respectively, from (b) fractions of fluid mixture corresponding to second periods of the first fluid respectively, portions of second fluid which are collected at that time being approximately a concentration corresponding to its first and third periods respectively.

14. A process as claimed in claim 13 and further comprising, separately collecting fractions of fluid mixture for intermediate periods between first and second periods of the first fluid or second and third periods of the second fluid, or between second and third periods of the first fluid or first and second periods of the second fluid, during which intermediate periods relative concentrations in m substances and in n substances are substantially equal to those of the admitted mixtures of m substances and n substances, respectively.

15. A process as claimed in claim 10, wherein the admitted mixture of n substances and the admitted mixture of m substances each comprise at least two isotopes.

16. A process as claimed in claim 15, wherein at least one of said first and second admitted fluids is a mixture of molecules of a substance several elements of which are as different isotope forms.

17. A process as claimed in claim 1, comprising admitting several different fluids in succession into the duct, in any admission order.

* * * * *